United States Patent
Sturman

(10) Patent No.: US 7,958,864 B2
(45) Date of Patent: Jun. 14, 2011

(54) COMPRESSION IGNITION ENGINES AND METHODS

(75) Inventor: Oded Eddie Sturman, Woodland Park, CO (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 171 days.

(21) Appl. No.: 12/354,624

(22) Filed: Jan. 15, 2009

(65) Prior Publication Data

US 2009/0183699 A1     Jul. 23, 2009

Related U.S. Application Data

(60) Provisional application No. 61/022,244, filed on Jan. 18, 2008.

(51) Int. Cl.
*F02M 23/00*     (2006.01)
(52) U.S. Cl. ......... 123/321; 123/532; 123/434; 123/699
(58) Field of Classification Search .................. 123/321, 123/434, 699, 532
See application file for complete search history.

(56) References Cited

U.S. PATENT DOCUMENTS

| | | | |
|---|---|---|---|
| 1,062,999 A * | 5/1913 | Webb | |
| 2,058,705 A * | 10/1936 | Maniscalco | |
| 3,209,737 A * | 10/1965 | Omotehara et al. | |
| 3,532,121 A * | 10/1970 | Sturman et al. | |
| 3,623,463 A * | 11/1971 | De Vries | |
| 3,683,239 A * | 8/1972 | Sturman | |
| 3,743,898 A * | 7/1973 | Sturman | |
| 3,952,710 A * | 4/1976 | Kawarada et al. | |
| 4,009,695 A * | 3/1977 | Ule | |
| 4,159,699 A * | 7/1979 | McCrum | 123/58.8 |
| 4,162,662 A * | 7/1979 | Melchior | |
| 4,192,265 A * | 3/1980 | Amano | |
| 4,230,075 A * | 10/1980 | Lowther | 123/68 |
| 4,312,038 A | 1/1982 | Imai et al. | |
| 4,326,380 A * | 4/1982 | Rittmaster et al. | |
| 4,396,037 A * | 8/1983 | Wilcox | |

(Continued)

FOREIGN PATENT DOCUMENTS

DE     37 27 335     2/1988

(Continued)

OTHER PUBLICATIONS

"International Search Report and Written Opinion of the International Searching Authority Dated Apr. 2, 2009", International Application No. PCT/US2009/031348.

(Continued)

*Primary Examiner* — Erick Solis
(74) *Attorney, Agent, or Firm* — Blakely Sokoloff Taylor & Zafman LLP

(57) ABSTRACT

Compression ignition engines and methods of the type wherein the engines operate with one cylinder used as a compression cylinder and a second cylinder used as a combustion cylinder. The engines have all cylinders configured so as to be able to operate as a compression cylinder or a combustion cylinder. In the method of operation, a cylinder may switch its operation between being a compression cylinder and then operate a combustion cylinder. Switching the operation between compression and combustion operation results in an even temperature distribution within the engine, and eliminates the need for special cooling requirements, facilitating retrofit of existing engines. Also use of an air storage tank allows all cylinders to operate as combustion cylinders for short bursts of power. Various other features are disclosed.

12 Claims, 4 Drawing Sheets

U.S. PATENT DOCUMENTS

| | | | |
|---|---|---|---|
| 4,409,638 A * | 10/1983 | Sturman et al. | |
| RE32,163 E | 5/1986 | Tokuda et al. | |
| 4,779,582 A * | 10/1988 | Lequesne | |
| 4,783,966 A * | 11/1988 | Aldrich | |
| 4,887,562 A * | 12/1989 | Wakeman | |
| 4,930,464 A * | 6/1990 | Letsche | |
| 5,003,937 A * | 4/1991 | Matsumoto et al. | |
| 5,022,358 A * | 6/1991 | Richeson | |
| 5,121,730 A * | 6/1992 | Ausman et al. | |
| 5,124,598 A * | 6/1992 | Kawamura | |
| 5,170,755 A * | 12/1992 | Kano et al. | |
| 5,193,495 A * | 3/1993 | Wood, III | |
| 5,209,453 A * | 5/1993 | Aota et al. | |
| 5,224,683 A * | 7/1993 | Richeson | |
| 5,237,968 A * | 8/1993 | Miller et al. | |
| 5,237,976 A * | 8/1993 | Lawrence et al. | |
| 5,248,123 A * | 9/1993 | Richeson et al. | |
| 5,255,641 A * | 10/1993 | Schechter | |
| 5,275,134 A * | 1/1994 | Springer | |
| 5,275,136 A * | 1/1994 | Schechter et al. | |
| 5,327,856 A | 7/1994 | Schroeder et al. | |
| 5,335,633 A | 8/1994 | Thien | |
| 5,339,777 A | 8/1994 | Cannon | |
| 5,367,990 A | 11/1994 | Schechter | |
| 5,373,817 A | 12/1994 | Schechter et al. | |
| 5,408,975 A | 4/1995 | Blakeslee et al. | |
| 5,410,994 A | 5/1995 | Schechter | |
| 5,419,492 A | 5/1995 | Gant et al. | |
| 5,421,521 A | 6/1995 | Gibson et al. | |
| 5,448,973 A | 9/1995 | Meyer | |
| 5,460,329 A | 10/1995 | Sturman | |
| 5,463,996 A | 11/1995 | Maley et al. | |
| 5,471,959 A | 12/1995 | Sturman | |
| 5,494,219 A | 2/1996 | Maley et al. | |
| 5,499,650 A | 3/1996 | Thring | |
| 5,507,316 A | 4/1996 | Meyer | |
| 5,526,778 A | 6/1996 | Springer | |
| 5,546,897 A | 8/1996 | Brackett | |
| 5,551,398 A | 9/1996 | Gibson et al. | |
| 5,572,961 A | 11/1996 | Schechter et al. | |
| 5,577,468 A | 11/1996 | Weber | |
| 5,598,871 A | 2/1997 | Sturman et al. | |
| 5,622,152 A | 4/1997 | Ishida | |
| 5,628,293 A | 5/1997 | Gibson et al. | |
| 5,638,781 A | 6/1997 | Sturman | |
| 5,640,987 A | 6/1997 | Sturman | |
| 5,669,355 A | 9/1997 | Gibson et al. | |
| 5,673,669 A | 10/1997 | Maley et al. | |
| 5,682,858 A | 11/1997 | Chen et al. | |
| 5,687,693 A | 11/1997 | Chen et al. | |
| 5,697,342 A | 12/1997 | Anderson et al. | |
| 5,700,136 A | 12/1997 | Sturman | |
| 5,713,316 A | 2/1998 | Sturman | |
| 5,720,261 A | 2/1998 | Sturman et al. | |
| 5,732,677 A | 3/1998 | Baca | |
| 5,738,075 A | 4/1998 | Chen et al. | |
| 5,752,659 A | 5/1998 | Moncelle | |
| 5,813,841 A | 9/1998 | Sturman | |
| 5,829,396 A | 11/1998 | Sturman | |
| 5,857,436 A | 1/1999 | Chen | |
| 5,873,526 A | 2/1999 | Cooke | |
| 5,894,730 A | 4/1999 | Mitchell | |
| 5,937,799 A | 8/1999 | Binion | |
| 5,954,030 A | 9/1999 | Sturman et al. | |
| 5,960,753 A | 10/1999 | Sturman | |
| 5,970,956 A | 10/1999 | Sturman | |
| 5,979,803 A | 11/1999 | Peters et al. | |
| 6,005,763 A | 12/1999 | North | |
| 6,012,430 A | 1/2000 | Cooke | |
| 6,012,644 A | 1/2000 | Sturman et al. | |
| 6,105,616 A | 8/2000 | Sturman et al. | |
| 6,109,284 A | 8/2000 | Johnson et al. | |
| 6,148,778 A | 11/2000 | Sturman | |
| 6,173,567 B1 | 1/2001 | Poola et al. | |
| 6,173,685 B1 | 1/2001 | Sturman | |
| 6,318,310 B1 * | 11/2001 | Clarke | 123/70 R |
| 6,352,056 B1 * | 3/2002 | Ruman | 123/65 PE |
| 6,412,706 B1 | 7/2002 | Guerrassi et al. | |
| 6,415,749 B1 | 7/2002 | Sturman et al. | |
| 6,543,411 B2 | 4/2003 | Raab et al. | |
| 6,575,384 B2 | 6/2003 | Ricco | |
| 6,592,050 B2 | 7/2003 | Boecking | |
| 6,655,355 B2 | 12/2003 | Kropp et al. | |
| 6,684,856 B2 | 2/2004 | Tanabe et al. | |
| 6,684,857 B2 | 2/2004 | Boecking | |
| 6,739,293 B2 | 5/2004 | Turner et al. | |
| 6,910,462 B2 | 6/2005 | Sun et al. | |
| 6,910,463 B2 | 6/2005 | Oshizawa et al. | |
| 6,939,517 B2 | 9/2005 | Ooe et al. | |
| 6,951,204 B2 | 10/2005 | Shafer et al. | |
| 6,951,211 B2 | 10/2005 | Bryant | |
| 6,994,077 B2 | 2/2006 | Kobayashi et al. | |
| 6,999,869 B1 | 2/2006 | Gitlin et al. | |
| 7,128,062 B2 | 10/2006 | Kuo et al. | |
| 7,314,043 B1 | 1/2008 | Berger et al. | |
| 7,353,786 B2 | 4/2008 | Scuderi et al. | |
| 7,481,039 B2 | 1/2009 | Surnilla et al. | |
| 2001/0017123 A1 * | 8/2001 | Raab et al. | |
| 2002/0166515 A1 | 11/2002 | Ancimer et al. | |
| 2003/0041593 A1 | 3/2003 | Yoshida et al. | |
| 2003/0226351 A1 * | 12/2003 | Glenn | |
| 2004/0045536 A1 | 3/2004 | Hafner et al. | |
| 2004/0177837 A1 | 9/2004 | Bryant | |
| 2005/0072407 A1 * | 4/2005 | Yu | 123/531 |
| 2005/0098162 A1 | 5/2005 | Bryant | |
| 2006/0032940 A1 * | 2/2006 | Boecking | |
| 2006/0243253 A1 * | 11/2006 | Knight | |
| 2007/0245982 A1 * | 10/2007 | Sturman | |
| 2008/0092860 A2 | 4/2008 | Bryant | |
| 2008/0264393 A1 * | 10/2008 | Sturman | |
| 2008/0275621 A1 | 11/2008 | Kobayashi | |
| 2009/0037085 A1 | 2/2009 | Kojima | |
| 2009/0199789 A1 * | 8/2009 | Beard | 123/2 |

FOREIGN PATENT DOCUMENTS

| | | |
|---|---|---|
| DE | 10239110 | 3/2004 |
| FR | 2901846 | 12/2007 |
| GB | 941453 | 11/1963 |
| GB | 2402169 | 12/2004 |
| JP | 60-035143 | 2/1985 |
| WO | WO-98/11334 | 3/1998 |
| WO | WO-01/46572 | 6/2001 |
| WO | WO-02/086297 | 10/2002 |

OTHER PUBLICATIONS

Anderson, Mark D., et al., "Adaptive Lift Control for a Camless Electrohydraulic Valvetrain", *SAE Paper No. 981029*, U. of Illinois and Ford Motor Co., (Feb. 23, 1998).

Blair, Gordon P., "Design and Simulation of Two-Stroke Engines", *SAE Publication No. R-161*, pp. 1-48.

Challen, Bernard, "Diesel Engine Reference Book Second Edition", *SAE Publication No. R-183*, pp. 27-71.

Cole, C., et al., "Application of Digital Valve Technology to Diesel Fuel Injection", *SAE Paper No. 1999-01-0196*, Sturman Industries, Inc., (Mar. 1, 1999).

Dickey, Daniel W., et al., "NOx Control in Heavy-Duty Diesel Engines—What is the Limit?", *In-Cylinder Diesel Particulate and NOx Control*, SAE Publication No. SP-1326, (1998), pp. 9-20.

Duret, P., "A New Generation of Two-Stroke Engines for the Year 2000", *A New Generation of Two-Stroke Engines for the Future?*, Paris, (1993), pp. 181-194.

Heisler, Heinz, "Vehicle and Engine Technology Second Edition", *SAE International*, London, (1999), pp. 292-308.

Kang, Kern Y., "Characteristics of Scavenging Flow in a Poppet-Valve Type 2-Stroke Diesel Engine by Using RSSV System", *Progress in Two-Stroke Engine and Emissions Control*, SAE Publication SP-1131, (1998), pp. 93-101.

Kim, Dean H., et al., "Dynamic Model of a Springless Electrohydraulic Valvetrain", *SAE Paper No. 970248*, U. of Illinois and Ford Research Company, (1997).

Misovec, Kathleen M., et al., "Digital Valve Technology Applied to the Control of an Hydraulic Valve Actuator", *SAE Paper No. 1999-01-0825*, Sturman Industries, Inc., (Mar. 1, 1999).

Nomura, K., et al., "Development of a New Two-Stroke Engine with Poppet-Valves: Toyota S-2 Engine", *A New Generation of Two-Stroke Engines for the Future?*, (1993), pp. 53-62.

Nuti, Marco, et al., "Twenty Years of Piaggio Direct Injection Research to Mass Produced Solution for Small 2T SI Engines", *Two-Stroke Engines and Emissions*, SAE Publication SP-1327, (1998), pp. 65-78.

Osenga, Mike, "Cat's HEUI System: A Look at the Future?", *Diesel Progress*, (Apr. 1995), pp. 30-35.

Schechter, Michael M., et al., "Camless Engine", *SAE Paper No. 960581*, Ford Research Lab, (Feb. 26, 1996).

Sturman, Carol, et al., "Breakthrough in Digital Valves", *Machine Design*, (Feb. 21, 1994), pp. 37-42.

Wilson, Rob, "Developments In Digital Valve Technology", *Diesel Progress North American Edition*, (Apr. 1997), pp. 76, 78-79.

Wirbeleit, F., et al., "Stratified Diesel Fuel-Water-Diesel Fuel Injection Combined with EGR-The Most Efficient In-Cylinder NOx and PM Reduction Technology", *Combustion and Emissions in Diesel Engines*, SAE Publication No. SP-1299, (1997), pp. 39-44.

\* cited by examiner

COMPRESSION IGNITION ENGINES AND METHODS

CROSS-REFERENCE TO RELATED APPLICATION

This application claims the benefit of U.S. Provisional Patent Application No. 61/022,244 filed Jan. 18, 2008.

BACKGROUND OF THE INVENTION

1. Field of the Invention

The present invention relates to the field of compression ignition engines.

2. Prior Art

U.S. Patent Application Publication No. 2007/0245982 entitled "Low Emission High Performance Engines, Multiple Cylinder Engines and Operating Methods", the disclosure of which is hereby incorporated herein by reference, discloses engine operating cycles which include the injection of air into the combustion chamber after ignition of the fuel injected during the compression stroke and after the piston passes top dead center to sustain and complete combustion. The preferred embodiments in that application inject air and some fuel into the combustion chamber during compression to get a pilot ignition at of near top dead center, followed by the injection of air and fuel after top dead center to sustain combustion through a substantial crank angle. That application also discloses the use of some cylinders of a multi-cylinder engine for compression of air for injection and the use of other cylinders as combustion cylinders.

DETAILED DESCRIPTION OF THE PREFERRED EMBODIMENTS

Figure 1:
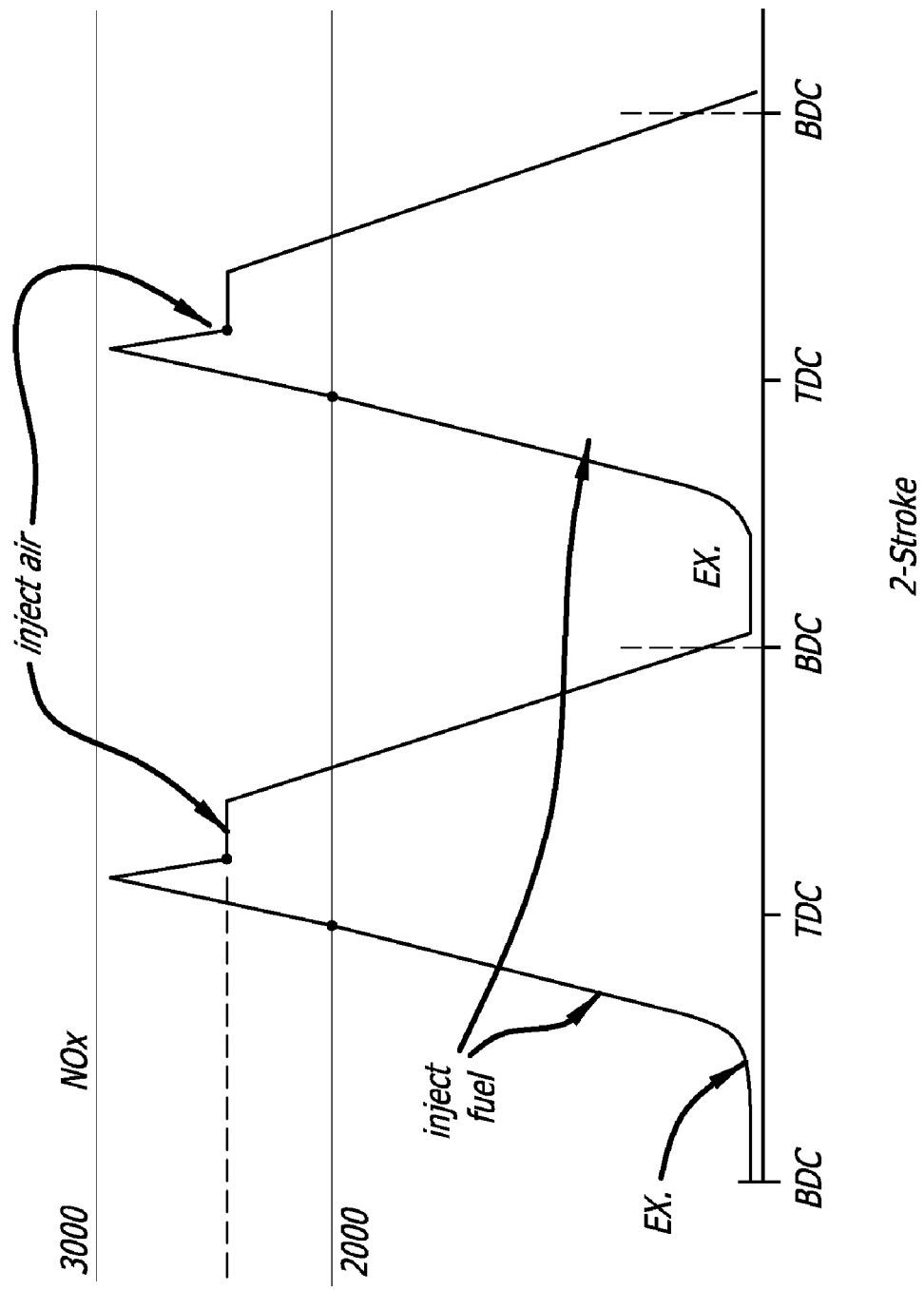
FIG. 1 is a graph schematically illustrating the preferred operation cycle of the present invention.

The preferred cycle of operation of the engines in accordance with the present invention is generally in accordance with the two cycle operation disclosed in the previously referenced published application, though with the amount of fuel injected after ignition and after the piston passes top dead center preferably being zero and the amount of air injected during compression typically similarly being zero or close to zero. In this case, all of the fuel to be injected is injected into the hot exhaust gasses from the prior power stroke, and thus converted to gaseous form prior to ignition. This is illustrated in FIG. 1. The ignition uses residual oxygen in the exhaust gasses, with the time of ignition being controlled by control of the time of the exhaust valve closure, and typically being controlled in part by adjustments based on prior operation of the engine as indicated by a pressure sensor in the combustion chamber. The maximum temperature reached after ignition is controlled in part by control of the excess air injected to sustain combustion during the previous power stroke, and thereafter by the rate in which air is injected to sustain combustion during the present power stroke. Both the time of ignition, and temperature in the combustion cylinder may be monitored, by way of example, by measuring pressure in the combustion cylinder, though other methods are also known.

In accordance with one aspect of the present invention, at any one time, any engine cylinder may be used for compression of air for injection or as a combustion cylinder, so every cylinder in a multi-cylinder engine is functionally the same. This allows the variation of cylinder use over time to provide a more uniform temperature distribution within the engine and more uniform wear characteristics, cylinder to cylinder.

Figure 2:
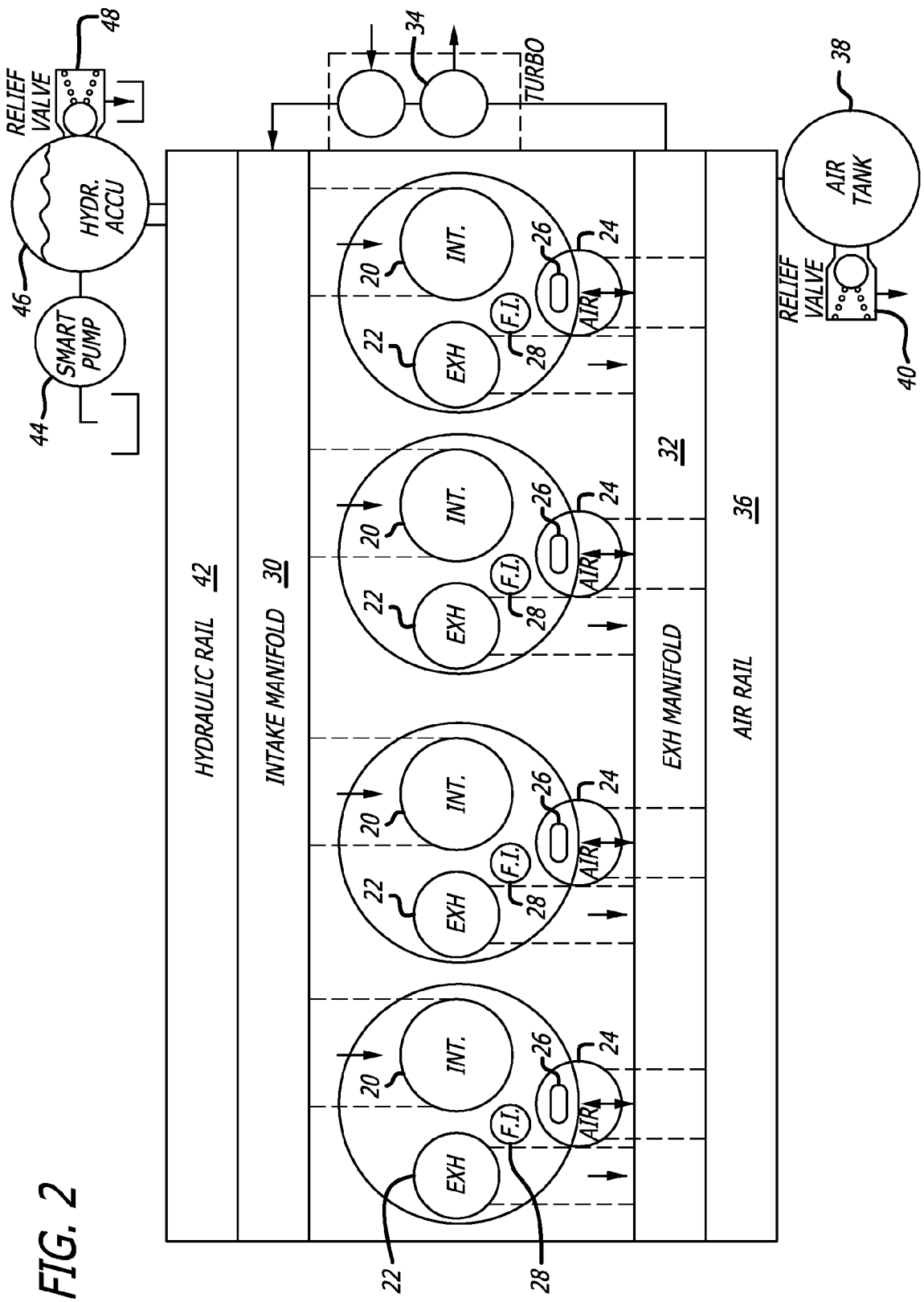
FIG. 2 is a schematic view of the underside of an engine head for a specific engine illustrating the incorporation of the present invention.

Now referring to FIG. 2, a view looking at the inside of one head of a V8 diesel engine may be seen. This Figure is actually a schematic representation of the diesel engines in the military Humvees. These engines have a single intake valve 20 and a single exhaust valve 22 for each cylinder. The engines also have, for each cylinder, a pre-mix chamber 24 ported to the compression/combustion chamber through port 26, in the present invention used as an air injection port. In addition, in accordance with the present invention, a fuel injector 28 has been added to each cylinder, which fuel injector may be of a relatively conventional design. The intake valves 20 are coupled to an intake manifold 30 and the exhaust valves 22 are coupled to an exhaust manifold 32. In the case of a retrofit of such diesel engines, the intake manifold 30 and exhaust manifold 32, as well as the turbo-charger 34, need not be replaced. The main difference between the original engine and after the conversion is the addition of the fuel injectors 28, the replacement of the pre-mix chambers 24 by air injection valves, the addition of a high pressure air rail 36 and an air storage tank 38 with safety relief valve 40, the addition of a hydraulic engine valve actuation system and controller, and the addition of a hydraulic rail 42 and a pump 44 with a hydraulic accumulator 46 and safety relief valve 48. The pump is preferably smart pump comprising a positive displacement pump with electrically controlled valving to pump to the system through a check valve when pumping is required, and otherwise simply pump from the pump outlet to the pump inlet. The air storage tank can be coupled to the air rail through an electrically controllable valve so that the air storage tank may be filled, such as during engine braking, and used for air injection later when needed.

Figure 3:
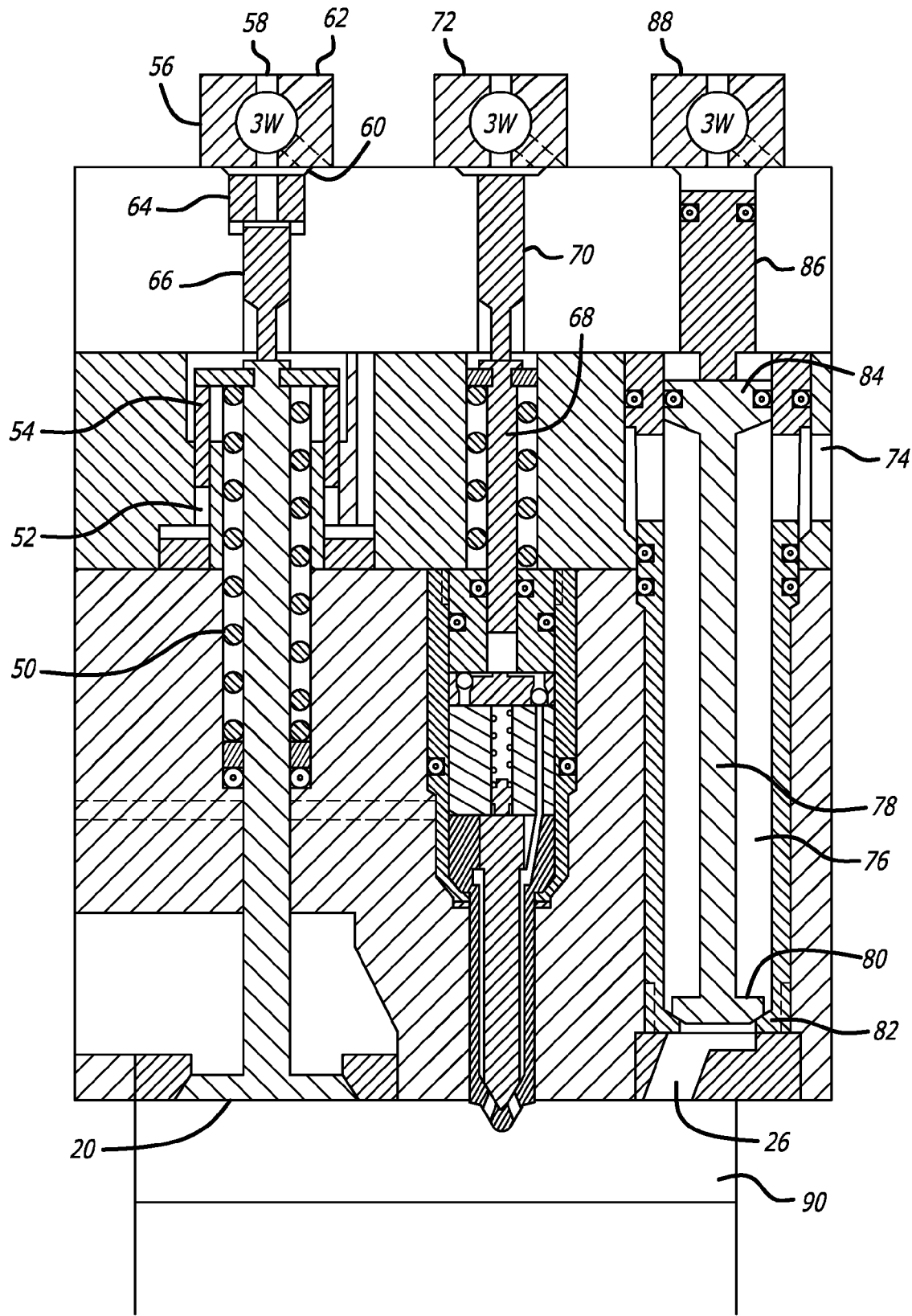
FIG. 3 is a schematic cross section taken through the engine valve, fuel injector and air injection valve of the engine head of FIG. 2.

FIG. 3 is a schematic cross-section taken in planes passing through one engine valve, the fuel injector, and the air injection valve. For purposes of specificity, assume that the engine valve shown in FIG. 3 is the intake valve 20, though the same is also representative of the exhaust valve 22. These engine valves, in accordance with the present invention, would be hydraulically operated, converting the engine to a camless engine. (See U.S. Pat. No. 6,739,293, the disclosure of which is hereby incorporated herein by reference.) In this embodiment, the engine valves are normally held closed by valve springs 50. Valve actuation fluid pressure is coupled to chambers 52 under pins 54 so that when the engine is running, the pins provide an additional engine valve closing force.

Engine valve actuation is controlled by a three-way valve 66, which either couples a source of actuation fluid under pressure on port 58 to region 60 or blocks port 58 and couples region 60 to a vent connection 62. When port 58 is coupled to region 60, pressure is applied over boost piston 64 and piston 66, boost piston 64 having a limited travel. In this way, when region 60 is pressurized with actuation fluid, the hydraulic area initially opening the valve corresponds to the area of the full diameter of boost piston 64. However, once engine valve opening has been initiated, further travel of boost piston 64 is prevented, stepping the effective hydraulic area to the area of piston 66 alone. In that regard, the area of piston 66 is intentionally made to exceed the aggregate area of pins 54 so as to continue opening the engine valve until maximum lift is achieved by some appropriate stop, such as by way of example, the bottoming of pins 54 to prevent further downward motion of the engine valve.

The fuel injector 28, as previously mentioned, can be of conventional design, in the preferred embodiment preferably an intensifier type injector having a fuel pressurizing piston 68 driven by an intensifier piston 70 and controlled by a three-way valve 72, functionally the same as three-way valve 56 controlling the engine valves. However the fuel injector can be configured to operate at a lower pressure than most because of the fact that the injection is into the hot exhaust gasses, which can turn the fuel into a gaseous form without the same degree of atomization normally desired by an injector in a diesel engine. This reduces the energy required to operate the fuel injectors, which in a conventional compression ignition engine can consume substantial power. Alternatively, or in addition to the lower pressure, one could use dual intensifiers with dual control valves so that either one or both intensifiers could be operated at any one time. Such intensifiers, by way of example, might have the same intensification ratio, though different intensified fuel delivery capacities, such as in the ratio of 2:1, so that the smaller intensifier could be used at idle and under lower power settings, the larger intensifier used for higher power settings and both intensifiers used for the highest power settings. This further saves energy in the fuel injection system. In that regard, one of the reasons for use of the boost piston 64 in the valve actuation system is to increase the initial opening force to overcome pressures in the cylinder and provide good initial acceleration of the valve toward the open position, and at the same time limit the hydraulic energy used in valve actuation by limiting the possible travel of the boost piston.

A cross-section of the air injection valve may be seen at the right of FIG. 3. The air injection valve communicates with port 26, already in the head of the Humvee diesel engine for communication with the pre-mix chamber 24. Air from the high pressure air rail 36 is coupled to port 74 and from there into region 76 surrounding stem 78 of the air valve. A poppet valve 80 is on the lower end of stem 78 and cooperates with the valve seat 82 at the upper entrance to port 26. At the top of stem 78 is a guide and seal 84 with a hydraulic piston 86 controlled by another three-way valve 88 at the top thereof to force hydraulic piston 86 downward to close the air injection valve, or to allow the pressure of the high pressure air in the combustion chamber 90 and in region 76, to cause the air injection valve to open. When a cylinder is being used as a compression cylinder, the air injection valve for that cylinder may be used or controlled as a form of check valve, allowing the air compressed by that cylinder to pass from or be injected from the cylinder to the air rail 36. The amount of air compressed may be controlled by the control of the intake valve 20 for that cylinder.

Figure 4:
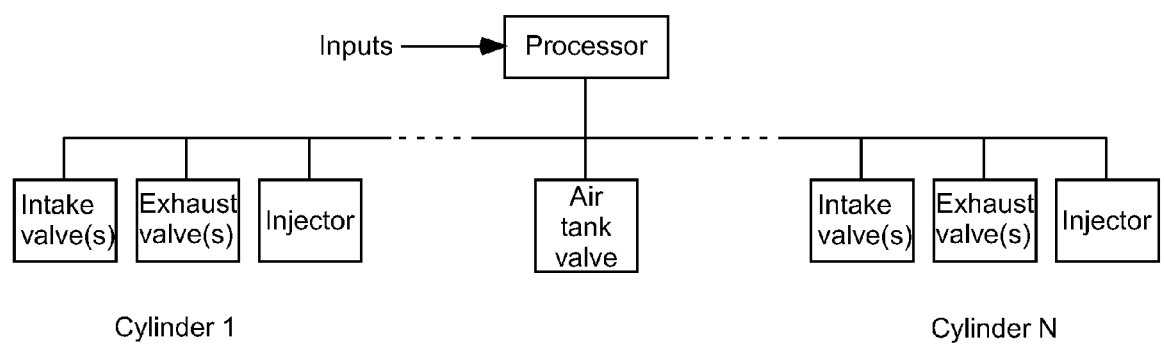
FIG. 4 is a block diagram of a control system useable in the present.

A block diagram of a control system for an engine in accordance with the present invention may be seen in FIG. 4. In the control system, one or more processors control the intake valve or valves of each cylinder, the exhaust valve or exhaust valves of each cylinder, the fuel injector of each cylinder and the air tank valve between the air tank and the air rail. Ignition may be indicated, by way of example, by a pressure sensor in each cylinder. Inputs to the processor would generally include crankshaft angle and perhaps also engine speed, engine power setting (generally in vehicles, the accelerator position), intake manifold pressure, intake manifold air and engine temperatures and air tank pressure, as well as inputs allowing adjustment of such things as engine valve actuation, cycle to cycle, based on when ignition occurred in the last cycle, to be sure ignition remains at or near top dead center of the respective piston, such as combustion chamber pressure.

The present invention has a number of substantial advantages over the prior art. These advantages include the ability to operate all cylinders as a conventional two or four cycle diesel engine by opening the intake valve during an intake stroke, fuel injection, with or without a pilot injection, starting near top dead center after the following compression stroke and continuing for some substantial crank angle thereafter, with the exhaust valve being opened for the exhaust stroke near the end of the combustion or power stroke, followed by another intake stroke (two cycle operation would eliminate the exhaust and intake strokes by opening both the intake and exhaust valve to allow the supercharger to replace most exhaust gases with fresh air at the end of the combustion or power stroke). This might be used for starting, with one or more of the cylinders then being switched over to act as compression cylinders. It also allows different combinations of cylinders to be used for compression and combustion from time to time, not only balancing out cylinder wear, but also better balancing heat generation within the engine to minimize differential expansion and to avoid an increase in local cooling requirements. This is particularly important in a retrofit of an existing engine, as changing the in-block cooling system would likely not be practical. Also, the use of air tank 38 (FIG. 2) to store high pressure air for injection to sustain ignition once ignition occurs allows a burst of power by using all cylinders as combustion cylinders for at least a short period of time. In that regard, the air storage tank 38 may be designed for storage of air at pressures well above that needed for air injection. In normal operation, the storage tank could be maintained at pressures as needed for air injection, but filled to the higher pressures when using the engine for braking, saving energy for later use. Similarly, when a burst of power will be needed and the storage tank pressure is not sufficiently above its normal operating pressure to supply the needed pressurized air for injection into the combustion cylinders when all cylinders are being used as combustion cylinders, the engine may be first operated in a manner to raise the air storage tank pressure, perhaps using more than the usual number of cylinders as compression cylinders when engine power output is down, and then using the pressure for short term air injection during which time all cylinders are used as combustion cylinders in two cycle operation as previously described. This could be highly useful, such as when powering out of heavy mud or sand, or when towing another vehicle out of similar conditions.

The present invention is ideally suited for retrofit of Humvee diesel engines because of the fact that such engines use a single intake valve and a single exhaust valve per cylinder, and in addition have a further port per cylinder for the premix chamber connection. As such, there is already the required port for air injection, and the head is sufficiently uncluttered to leave space for addition of a fuel injector for each cylinder. However other engines may be similarly retrofit, though at least in some instances may require a head replacement rather than merely a head conversion. Obviously of course the present invention is also applicable to new engines where there are no substantial preexisting limitations effecting the application of the present invention, and is not limited to engines with only a single intake and single exhaust valve in each cylinder.

Of course the present invention may be practiced in various ways as desired. By way of example, while in the preferred embodiment, all fuel is injected into residual hot exhaust gases and ignited on excess air that was injected during the prior power stroke, some air could be injected during each compression stroke, provided that the $NO_x$ formation temperature is not exceeded. However using only the excess air is preferred, as some excess air injection is desired during each power stroke to assure complete combustion of the gaseous fuel in the combustion chamber. Similarly, some fuel could be injected into the combustion chamber after ignition, during the power stroke, though this is not preferred because of the resulting hot spots during combustion, giving rise to the formation of $NO_x$ and/or incomplete combustion because of imperfect atomization in the injected fuel.

One feature of engines in accordance with the present invention is their ability to operate on any fuel, or on mixtures of fuels. This is enabled by the fact that the time (crank angle) of ignition and combustion itself is controlled in part by adjustments in the control of exhaust valve closure timing and the injections themselves based at least in part on recent past history, typically at least more heavily considering the immediately prior compression and power strokes. This flexibility should even allow the consumption of part of a tank of one fuel, and the filling of the tank with another fuel, as the engine will self adjust as the new fuel begins to pass to the engine. Even fuels initially in a gaseous form, or liquefied gases, may be used, provided the injectors and fuel control system are designed to use such fuels.

While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. An engine comprising:
   a multi-cylinder compression ignition engine having at least one intake valve, at least one exhaust valve, a fuel injector and an air injection valve coupled to each cylinder of the multi-cylinder engine;
   the engine having an air rail coupled to the air injection valve of each cylinder, each air injection valve being controllable to allow air compressed by the respective cylinder to pass to the air rail when that cylinder is being used as a compression cylinder, or to allow air to pass from the air rail to the respective cylinder when that cylinder is being used as a combustion cylinder, including after ignition during combustion;
   the engine being a camless engine;
   whereby all cylinders are capable of operating as a compression cylinder or a combustion cylinder.

2. The engine of claim 1 further comprised of an air storage tank coupled to the air rail, wherein the air storage tank may be pressurized and then used as a source of air for injection, whereby all cylinders may operate as combustion cylinders.

3. The engine of claim 1 further comprised of a controller for controlling operation of the at least one intake valve, the at least one exhaust valve, the fuel injector and the air injection valve coupled to each cylinder of the multi-cylinder engine.

4. The engine of claim 3 wherein the control is based on, at least in part, inputs indicating crankshaft angle, engine power setting, intake manifold pressure, intake manifold air and engine temperatures and air tank pressure and combustion chamber pressure.

5. A method of providing mechanical power comprising:
   providing a multi-cylinder compression ignition camless engine having at least one intake valve, at least one exhaust valve, a fuel injector and an air injection valve coupled to each cylinder of the multi-cylinder engine, the engine having an air rail coupled to the air injection valve of each cylinder, each air injection valve being controllable to allow air compressed by the respective cylinder to pass to the air rail when that cylinder is being used as a compression cylinder, or to allow air to pass from the air rail to the respective cylinder when that cylinder is being used as a combustion cylinder, including after ignition during combustion;
   controlling the camless engine so that at least one cylinder of the engine operates as a compression cylinder and at least one cylinder of the engine operates as a combustion cylinder;
   changing the control from time to time so that each cylinder sometimes operates as a compression cylinder and sometimes operates as a combustion cylinder.

6. The method of claim 5 wherein each cylinder of the camless engine is operated as both a compression and combustion cylinder in a two stroke cycle for starting the engine.

7. The method of claim 5 wherein each cylinder of the camless engine is operated as both a compression and combustion cylinder in a four stroke cycle for starting the engine.

8. The method of claim 5 further comprising:
   providing the camless engine with an air storage tank coupled to the air rail through a valve;
   filling the air storage tank from cylinders then being used for compression cylinders; and then,
   using the compressed air in the air storage tank for operating all cylinders as combustion cylinders to obtain a burst of power from the camless engine.

9. The method of claim 8 further wherein using the compressed air in the air storage tank for operating all cylinders as combustion cylinders to obtain a burst of power from the camless engine comprises:
   using the compressed air in the air storage tank for operating all cylinders as combustion cylinders in two cycle operation to obtain a burst of power from the camless engine.

10. The method of claim 5 further comprising:
    providing the camless engine with an air storage tank coupled to the air rail through a valve;
    using all cylinders for compression cylinders for filling the air storage tank when using the camless engine for braking; and then
    using the compressed air in the air storage tank for operating all cylinders as combustion cylinders to obtain a burst of power from the camless engine.

11. The method of claim 10 further wherein using the compressed air in the air storage tank for operating all cylinders as combustion cylinders to obtain a burst of power from the camless engine comprises:
    using the compressed air in the air storage tank for operating all cylinders as combustion cylinders in two cycle operation to obtain a burst of power from the camless engine.

12. The method of claim 5 wherein the control is through a controller having inputs indicating crankshaft angle, engine power setting, intake manifold pressure, intake manifold air and engine temperatures and air tank pressure and combustion chamber pressure.

* * * * *